T. L. RANKIN.
PIPE CONNECTIONS FOR ICE-MACHINES.

No. 174,572. Patented March 7, 1876.

WITNESSES
Franck L. Ouisand
C. L. Everh.

INVENTOR
Thomas L. Rankin
By Alexander Mason
Attorneys.

UNITED STATES PATENT OFFICE.

THOMAS L. RANKIN, OF EMPORIA, KANSAS.

IMPROVEMENT IN PIPE-CONNECTIONS FOR ICE-MACHINES.

Specification forming part of Letters Patent No. 174,572, dated March 7, 1876; application filed December 14, 1875.

*To all whom it may concern:*

Be it known that I, T. L. RANKIN, of Emporia, in the county of Lyon and in the State of Kansas, have invented certain new and useful Improvements in Pipe-Connections for Ice-Machines; and do hereby declare that the following is a full, clear, and exact description thereof, reference being had to the accompanying drawings and to the letters of reference marked thereon, making a part of this specification.

My invention relates particularly to the pipes used for conveying the gas used as a freezing agent in ice-machines; and the nature of my invention consists in the construction and arrangement of a coupling or connection for such pipes, as will be hereinafter more fully set forth.

In order to enable others skilled in the art to which my invention appertains to make and use the same, I will now proceed to describe its construction and operation, referring to the annexed drawings, in which—

Figure 1:
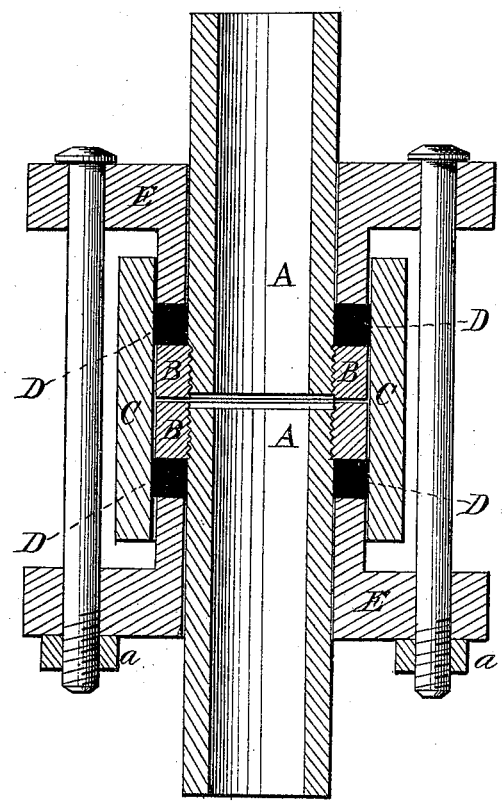
Figure 2:
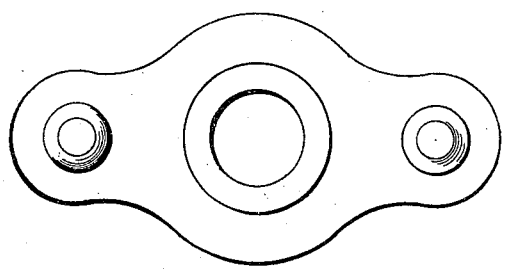

Figure 1 is a longitudinal section of the pipe-connection. Fig. 2 is an end view of the same.

A A represent two pieces or sections of pipe, upon the ends of which are screwed round collars B B. These collars may, however, be attached in any other suitable manner that will make them permanent and secure on the ends of the pipe-sections. When the ends of the pipe-sections are to be placed together, a sleeve or cylinder, C, is slipped around the collars B B, which sleeve projects a suitable distance inward beyond each collar, as shown in the drawing. In each end of the sleeve C is inserted a rubber collar, D, surrounding the pipe-section, and bearing on the collar B, and on each rubber collar is placed a gland or follower, E. The two glands E E are connected by bolts G G, having nuts *a a* upon their ends. By screwing up these bolts the rubber collars D D are compressed by the glands or followers E E against the pipes, so as to effectually prevent any leakage of gas. The greatest difficulty experienced in the construction of ice-machines is to prevent leakage of the gas at the joints or connections of the pipes. By my invention a tight and strong connection is formed, which is proof against ammonia gas.

If desired, the collars B B and exterior sleeve or cylinder C, may be formed of one piece, and the pipe-sections A A screwed or otherwise fastened therein.

Having thus fully described my invention, what I claim as new, and desire to secure by Letters Patent, is—

The combination, with pipe-sections A A, of the collars B B fastened on the ends thereof, the sleeve or cylinder C, rubber collars D D, glands or followers E E, and bolts G G, all substantially as and for the purposes herein set forth.

In testimony that I claim the foregoing I have hereunto set my hand this 3d day of December, 1875.

THOS. L. RANKIN.

Witnesses:
 C. L. EVERT,
 M. A. STOWELL.